(12) United States Patent
Kachman (10) Patent No.: US 9,694,399 B2
(45) Date of Patent: Jul. 4, 2017

(54) COMPACT PROFILE WATER CATCHMENT AND SOIL TREATMENT SYSTEM

(71) Applicant: Christofer Jay Kachman, Tacoma, WA (US)

(72) Inventor: Christofer Jay Kachman, Tacoma, WA (US)

(*) Notice: Subject to any disclaimer, the term of this patent is extended or adjusted under 35 U.S.C. 154(b) by 54 days.

(21) Appl. No.: 14/604,528

(22) Filed: Jan. 23, 2015

(65) Prior Publication Data
US 2015/0202669 A1 Jul. 23, 2015

Related U.S. Application Data (60) Provisional application No. 61/930,759, filed on Jan. 23, 2014.

(51) Int. Cl.
*E02B 11/00* (2006.01)
*B09C 1/00* (2006.01)

(52) U.S. Cl.
CPC .................................. *B09C 1/002* (2013.01)

(58) Field of Classification Search
CPC ......... E02B 11/00; E02B 11/005; E02B 13/00
USPC ............ 405/36, 43, 44, 45, 47, 50, 51; 210/170.01, 170.07, 747.1, 747.7
See application file for complete search history.

(56) References Cited

U.S. PATENT DOCUMENTS 4,293,237 A * 10/1981 Robey ................... A01G 25/06
405/39

FOREIGN PATENT DOCUMENTS

JP    2007-211546 A  *  8/2007
SU        721501 a  *  3/1980

OTHER PUBLICATIONS

Abstract of Japanese doucment JP 2007211546 A, date Aug. 2007, 2 pages.*

* cited by examiner

*Primary Examiner* — Sunil Singh (57) ABSTRACT

A compact profile water catchment and soil treatment system includes a drainage hub, a water transfer pipe, and a particle filter system. Compact drainage fixtures of the drainage hub are able to drain surface and ground water from the surrounding environment so that the drained water can be transferred into an outfall through the water transfer pipe. The water transfer pipe can also interconnect additional drainage hubs in order to accommodate for a larger drainage area. The particle filter system is laid atop the drainage hub and the water transfer pipe, where the particle filter system functions as the initial filtration system in addition to the secondary filtration system of the compact drainage fixtures.

19 Claims, 10 Drawing Sheets

COMPACT PROFILE WATER CATCHMENT AND SOIL TREATMENT SYSTEM

The current application claims a priority to the U.S. Provisional Patent application Ser. No. 61/930,759 filed on Jan. 23, 2014.

FIELD OF THE INVENTION

The present invention relates generally to a drainage system. More specifically, the present invention is a compact system that drains excess water while improving the soil condition of the affected area.

BACKGROUND OF THE INVENTION

Traditional drainage systems, such as French draining system, weeping tile system, rubble draining system, rock draining system, and land draining system, are utilized in different environments settings so that surface water and ground water can be redirected. Most of the traditional drainage systems utilize gravitational force, where the excess amount of water is drained from a higher elevation to a lower elevation with the aid of the gravitational force.

The main problems of the existing drainage systems are the associated installation cost and maintenance cost. More specifically, the installation cost is higher due to the excavation area and excess amount of material used to install the drainage system. Due to complicated installation configurations, most the existing drainage systems tend to get clog overtime requiring additional maintenance cost. Additionally, almost all of the existing drainage systems only provide single filtration for the surface water and ground water. As a result, the drained water from the single filtration contaminates the outfall sources such as rivers and ponds.

It is an object of the present invention to introduce a compact water catchment and soil treatment system so that the present invention is able to provide an efficient drainage system while providing sequestrating nitrogen into the earth to be used for plant production. The present invention minimizes installation cost due to the shallow depth and narrow width of the trench. Additionally, the present invention also decreases the maintenance cost due to the linear configuration as the present invention completely eliminates unnecessary bends and turns that normally creates clogging within the system. The present invention also provides double filtration and bio filtration for the surface water and ground water so that the drained water can be reused and purified before it enters into the outfall sources.

DETAIL DESCRIPTIONS OF THE INVENTION

All illustrations of the drawings are for the purpose of describing selected versions of the present invention and are not intended to limit the scope of the present invention.

Figure 1:
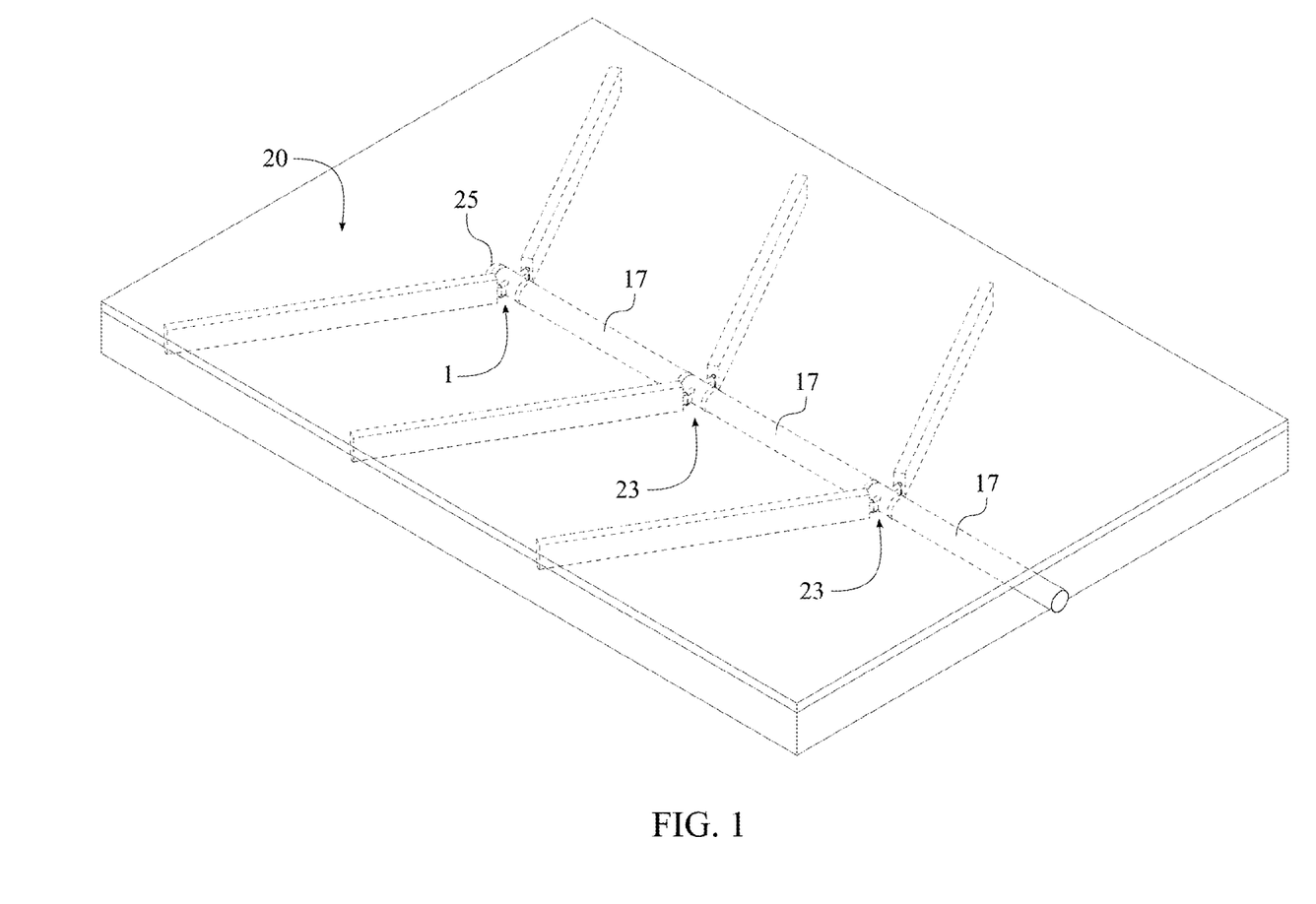
FIG. 1 is a perspective view of the present invention, wherein the present invention is installed within a specific area.

The present invention is a compact profile water catchment and soil treatment system so that the present invention is able to drain surface and ground water away from the collecting areas and into a designated area. In reference to FIG. 1 and FIG. 7, the present invention comprises a drainage hub 1, a water transfer pipe 17, and a particle filter system 20. In reference to the general configuration of the present invention, the drainage hub 1 accumulates surface and ground water as surface and the ground water filters through the particle filter system 20. Then the drained water can be redirected through the water transfer pipe 17, where the drained water flows into at least one adjacent drainage hub 23 or an outfall 24.

Figure 2:
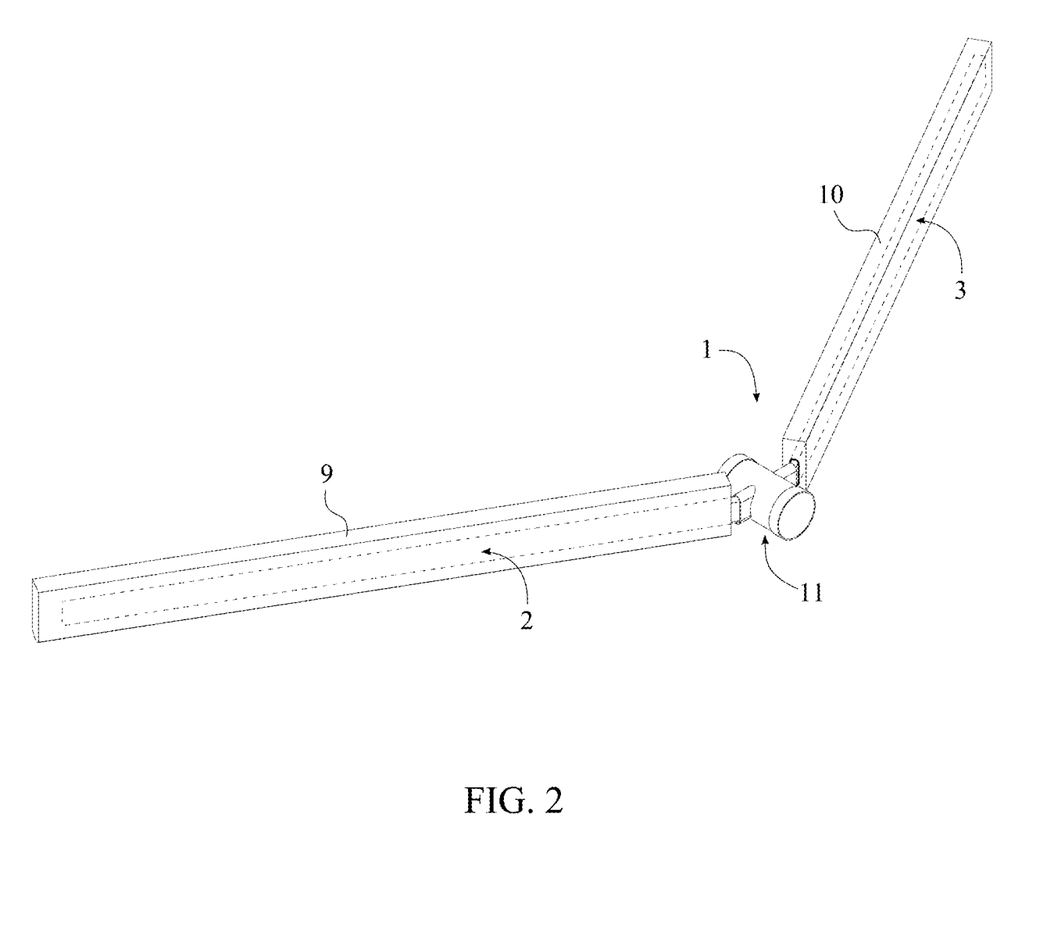
FIG. 2 is a perspective view of the drainage hub of the present invention.

In reference to FIG. 2, the drainage hub 1 that collects surface and ground water comprises a first compact drainage fixture 2, a second compact drainage fixture 3, a first drain mix channel 9, a second drain mix channel 10, and a universal adaptor 11. The first compact drainage fixture 2 and the second compact drainage fixture 3 are in fluid communication with the universal adaptor 11 while the first drain mix channel 9 and the second drain mix channel 10 are in fluid communication with the first compact drainage fixture 2 and the second compact drainage fixture 3 respectively.

Figure 3:
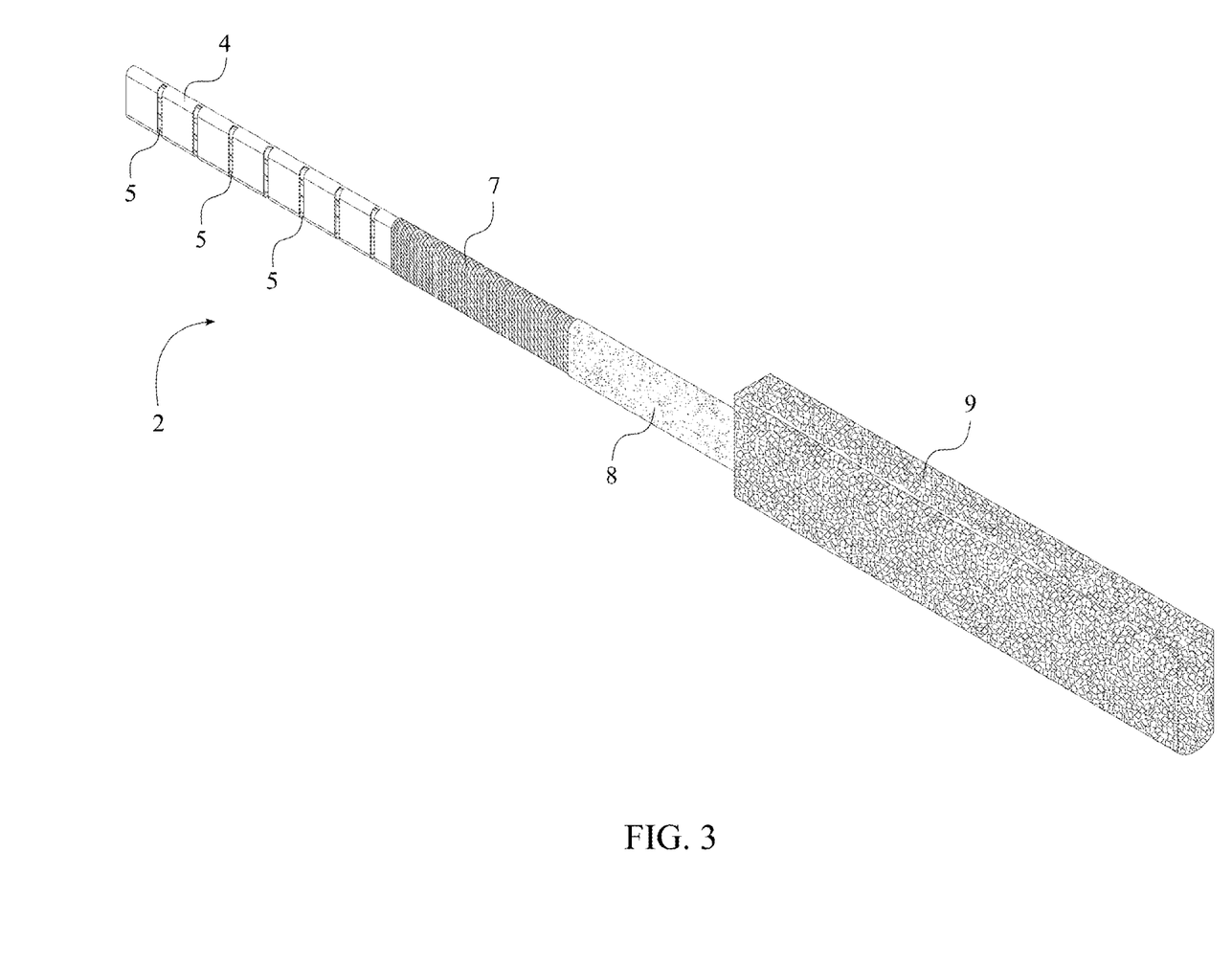
FIG. 3 is a perspective exploded view of the first compact drainage fixture of the present invention.
Figure 4:
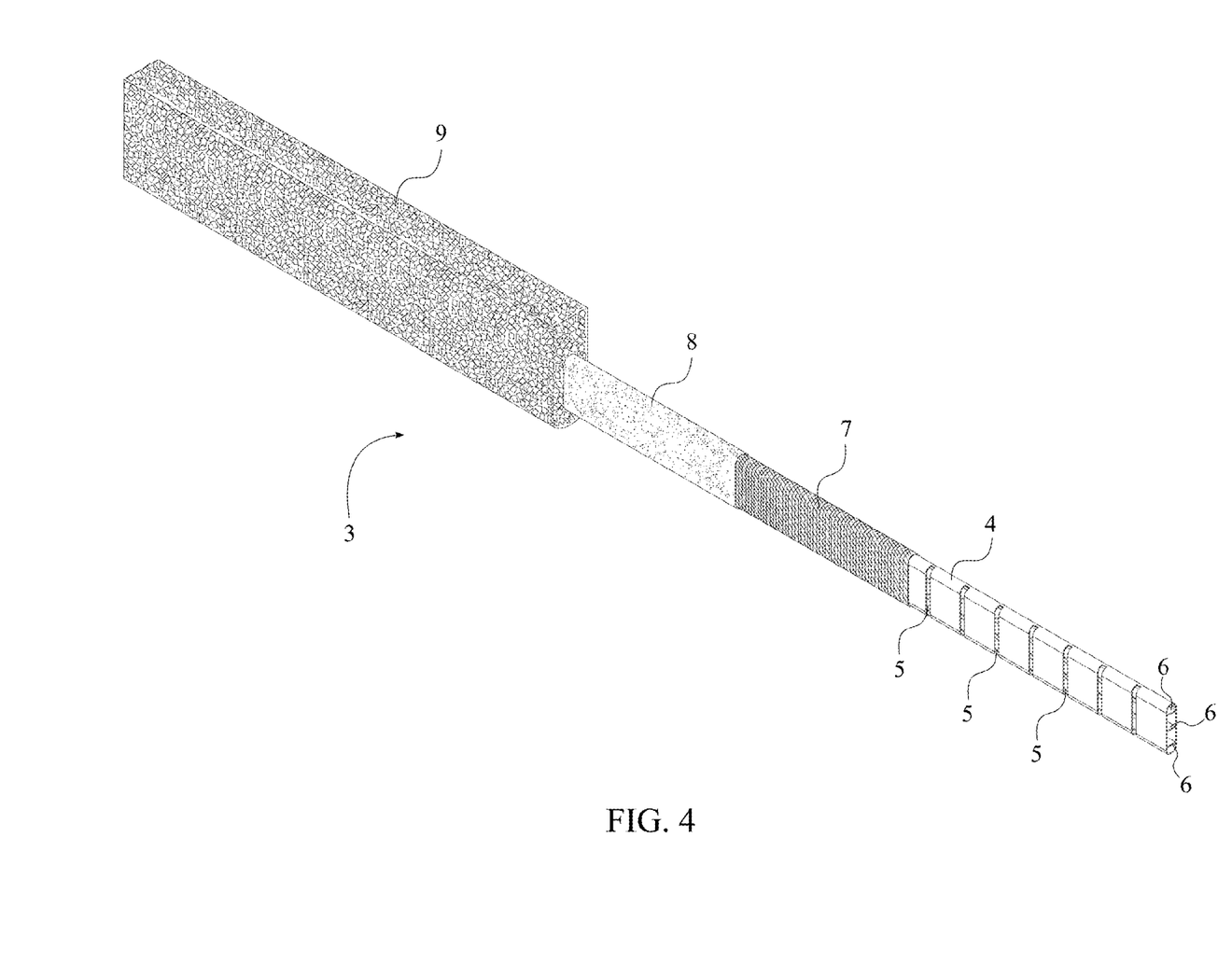
FIG. 4 is a perspective exploded view of the second compact drainage fixture of the present invention.

In reference to FIG. 3 and FIG. 4, the first compact drainage fixture 2 and the second compact drainage fixture 3 function as the drain extension arms for the drainage hub 1 so that the drainage hub 1 is able to cover a larger drainage area. For the proper functionality of the drainage hub 1, the first compact drainage fixture 2 and the second compact drainage fixture 3 each comprise a core channel 4, a spacer netting 7, and a filter sock 8. The core channel 4 is generally shaped into an elongated flat oval shape within the present invention; however the core channel 4 can also be shaped into any other type of geometric shapes such as, round, triangular, square, and trapezoidal. The core channel 4 can be made of non-corrosive and rigid materials include, but not limited to, ceramic, plastic, alloy, Polyvinyl chloride (PVC), Acrylonitrile butadiene styrene (ABS), and composite as different specific site conditions and volume of drained water can be different from one drainage area to another. The core channel 4 comprises a plurality of drain notches 5 and a plurality of lateral support struts 6. More specifically, the plurality of drain notches 5 that allows surface water and ground water to enter into the compact drainage fixture is externally positioned across the core channel 4. In other words, the plurality of drain notches 5 vertically extends from a top end of the core channel 4 to a bottom end of the core channel 4. Additionally, the plurality of drain notches 5 improves the lateral flexibility of the core channel 4. The plurality of lateral support struts 6 is internally connected along the core channel 4. The plurality of lateral support struts 6 enables the core channel 4 to maintain its manufactured shaped while allowing the installer of the present invention to maintain consistent slop needed for positive drainage. The core channel 4 is in fluid communication with the spacer netting 7 as the core channel 4 is perimetrically encircled by the spacer netting 7. The plurality of drain notches 5 is also adjacently positioned to the spacer netting 7 so that core channel 4 can easily collect surface water and ground water. The spacer netting 7 is a geotextile filter where the spacer netting 7 allows the infiltration for surface water and ground water while keeping the sediments away from the core channel 4. The spacer netting 7 is in fluid communication with the filter sock 8 as the spacer netting 7 is perimetrically encircled by the filter sock 8. The filter sock 8 functions similar to the spacer netting 7 so that the filter sock 8 and the spacer netting 7 are able to provide filtration for surface water and ground water while eliminating the sediment that may clog the core channel 4.

Figure 5:
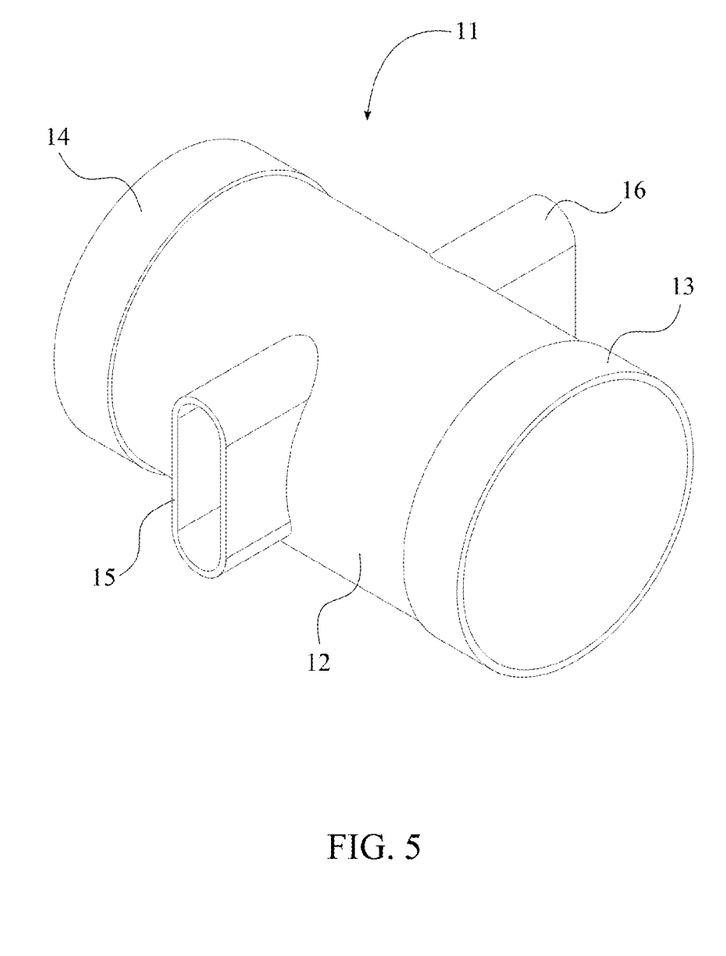
FIG. 5 is a perspective view of the universal adaptor of the present invention.

In reference to FIG. 5, the universal adaptor 11 functions as the connecting unit for the first compact drainage fixture 2, the second compact drainage fixture 3, and the water transfer pipe 17. The universal adaptor 11 comprises a housing sleeve 12, a first pipe receiver port 13, a second pipe receiver port 14, a first compact drainage fixture receiver port 15, and a second compact drainage fixture receiver port 16. The housing sleeve 12 is preferably shaped into circular shape so that the housing sleeve 12 is able to accept standard water transfer pipe 17. The first pipe receiver port 13 and the second pipe receiver port 14 are oppositely positioned of each other across the housing sleeve 12. More specifically, the first pipe receiver port 13 and the second pipe receiver port 14 are diametrically opposed of each other so that the first pipe receiver port 13 and the second pipe receiver port 14 are able to connect with the water transfer pipe 17. The first compact drainage fixture receiver port 15 and the second compact drainage fixture receiver port 16 are traversed into the housing sleeve 12 in such a way that the first compact drainage fixture receiver port 15 and the second compact drainage fixture receiver port 16 are oppositely positioned from each other in between the first pipe receiver port 13 and the second pipe receiver port 14. Due to the configuration of the first compact drainage fixture receiver port 15 and the second compact drainage fixture receiver port 16, the universal adaptor 11 is able to connect with both the first compact drainage fixture 2 and the second compact drainage fixture 3 enabling the present invention to cover a larger drainage area.

Figure 9:
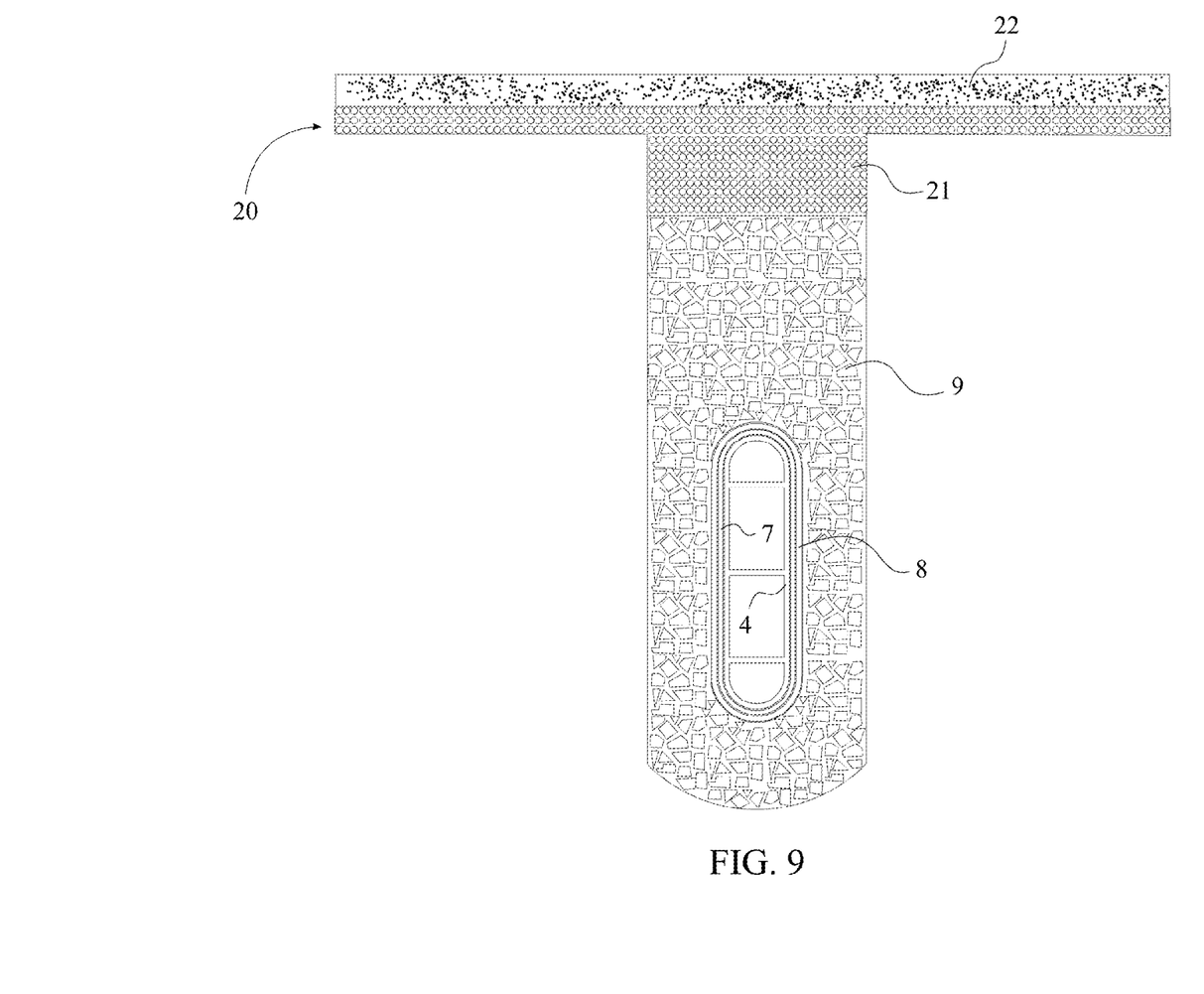
FIG. 9 is a cross section view of the first compact drainage fixture, wherein the particle filter system illustrates the dressing mix layer and the finishing mix layer.
Figure 10:
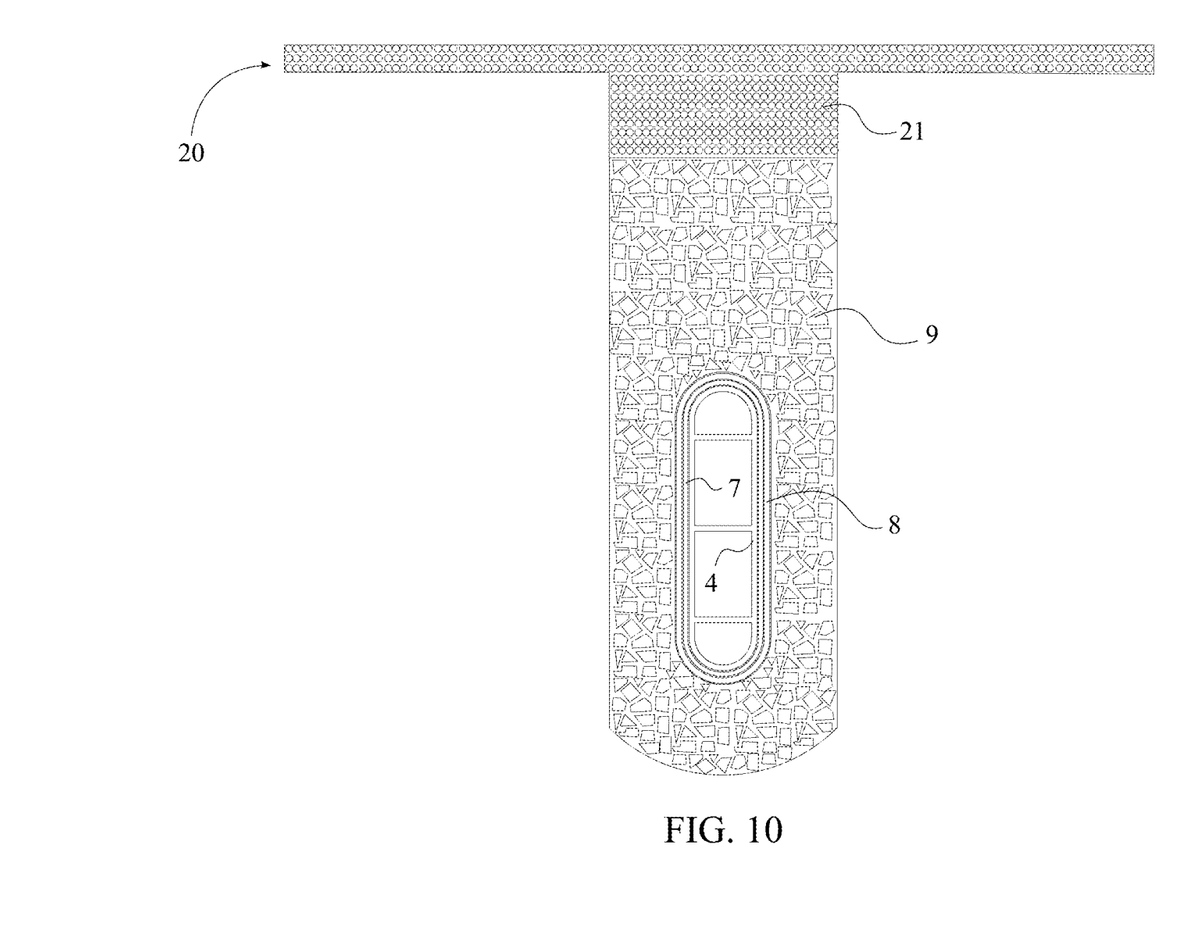
FIG. 10 is a cross section view of the first compact drainage fixture, wherein the particle filter system illustrates the dressing mix layer.

In reference to FIG. 9-FIG. 10, the core channel 4 of the first compact drainage fixture 2 is in fluid communication with the first compact drainage fixture receiver port 15, and the filter sock 8 of the first compact drainage fixture 2 is enclosed opposite of the universal adaptor 11. As a result, surface water and ground water is able to travel from the first compact drainage fixture 2 to the universal adaptor 11. Similarly, the core channel 4 of the second compact drainage fixture 3 is in fluid communication with the second compact drainage fixture receiver port 16, and the filter sock 8 of the second compact drainage fixture 3 is enclosed opposite of the universal adaptor 11. As a result, surface water and ground water is able to travel from the second compact drainage fixture 3 to the universal adaptor 11. Both the first compact drainage fixture 2 and the second compact drainage fixture 3 are positioned opposite of each other in such a way that the universal adaptor 11, the first compact drainage fixture 2, and the second compact drainage fixture 3 create a herringbone configuration within the present invention.

In reference to FIG. 9-FIG. 10, the first drain mix channel 9 and the second drain mix channel 10 are composed of clean particles, and the particles function as a second part of the primary filtration process before surface water and ground water reaches the first compact drainage fixture 2 and the second compact drainage fixture 3. More specifically, the first drain mix channel 9 is in fluid communication with the filter sock 8 of the first compact drainage fixture 2 as the filter sock 8 of the first compact drainage fixture 2 is encircled by the first drain mix channel 9. Similarly, the second drain mix channel 10 is in fluid communication with the filter sock 8 of the second compact drainage fixture 3 as the filter sock 8 of the second compact drainage fixture 3 is encircled by the second drain mix channel 10.

Figure 6:
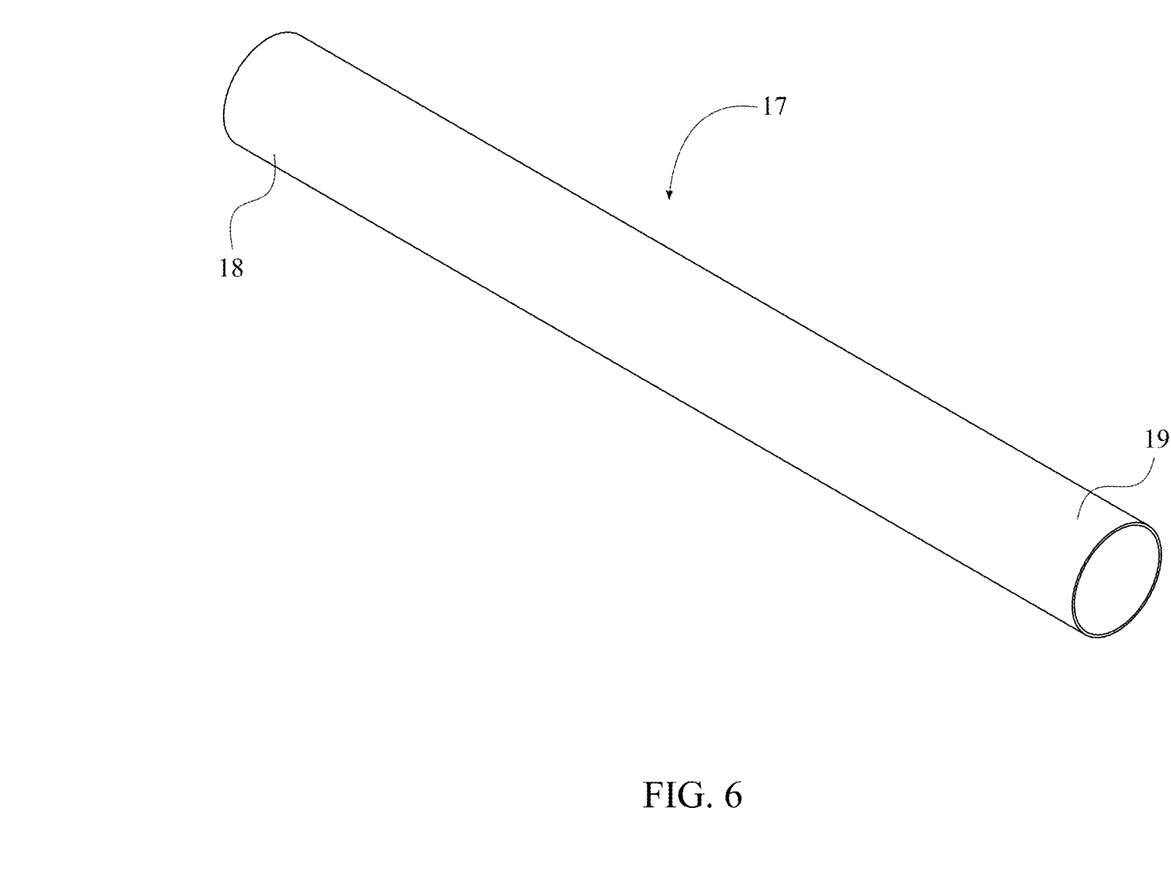
FIG. 6 is a perspective view of the water transfer pipe of the present invention.

In reference to FIG. 6, the water transfer pipe 17 is hollow cylindrical tube and can be made of non-corrosive and rigid materials include, but not limited to, ceramic, plastic, alloy, Polyvinyl chloride (PVC), Acrylonitrile butadiene styrene (ABS), and composite as the material can differ depending on specific site condition and the volume of drained water. The actual shape of the water transfer pipe 17 is directly related to the shape of the universal adaptor 11 as the water transfer pipe 17 connects with the universal adaptor 11. For example, since the preferred embodiment of the present invention comprises the cylindrical shape universal adaptor 11, the water transfer pipe 17 is also shaped into the cylindrical shape so that the universal adaptor 11 and the water transfer pipe 17 are able to directly connect with each other.

Figure 7:
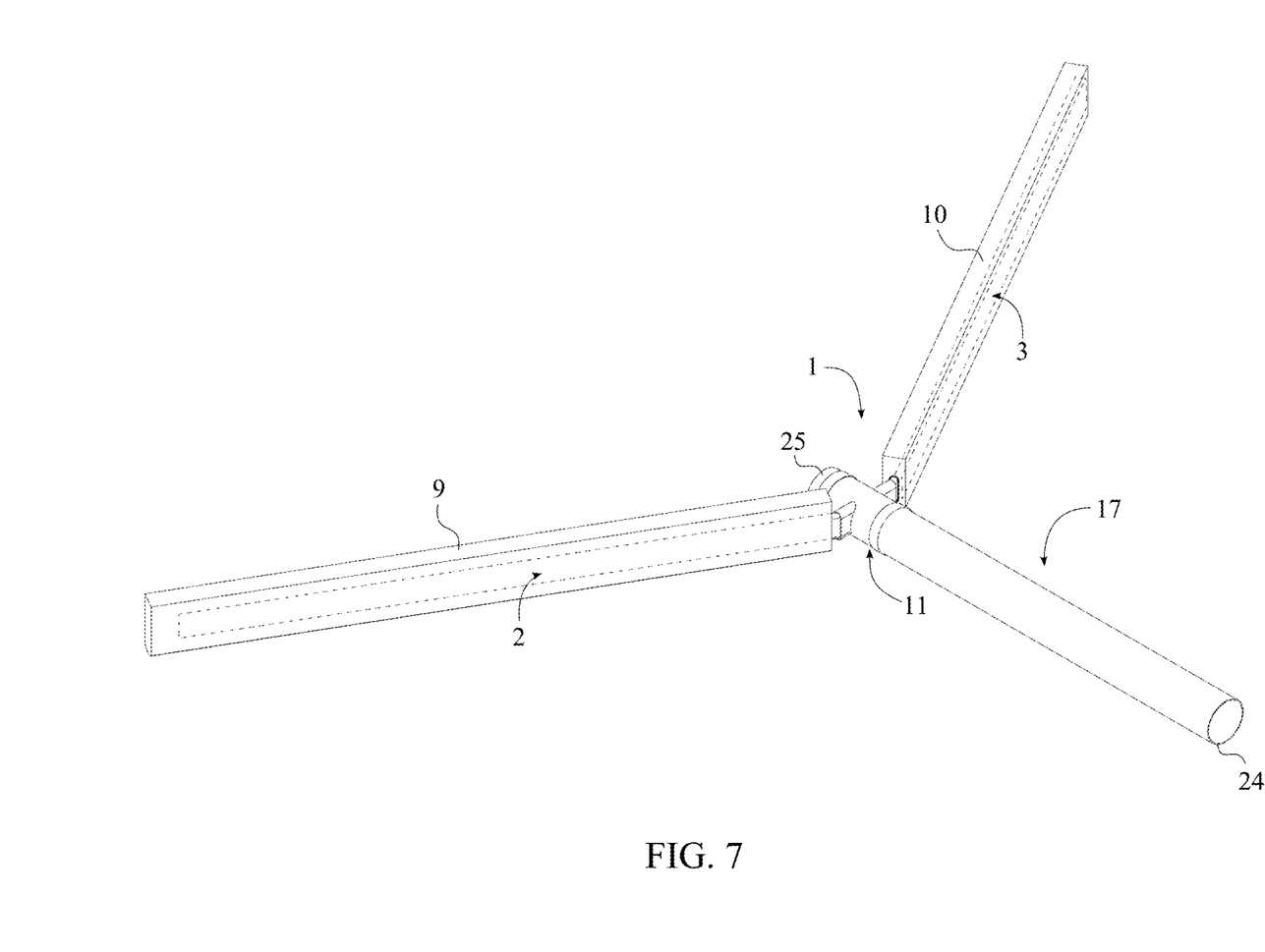
FIG. 7 is a perspective view of single drainage hub configuration of the present invention.

In reference to the FIG. 7, the first configuration of the present invention comprises only a single drainage hub 1. More specifically, a first end 18 of the water transfer pipe 17 is in fluid communication with the first pipe receiver port 13, where a second end 19 of the water transfer pipe 17 is in fluid communication with the outfall 24. The second pipe receiver port 14 is enclosed with a plug 25 so that the drainage hub 1 is able to discharge the drained water towards the direction of the outfall 24.

Figure 8:
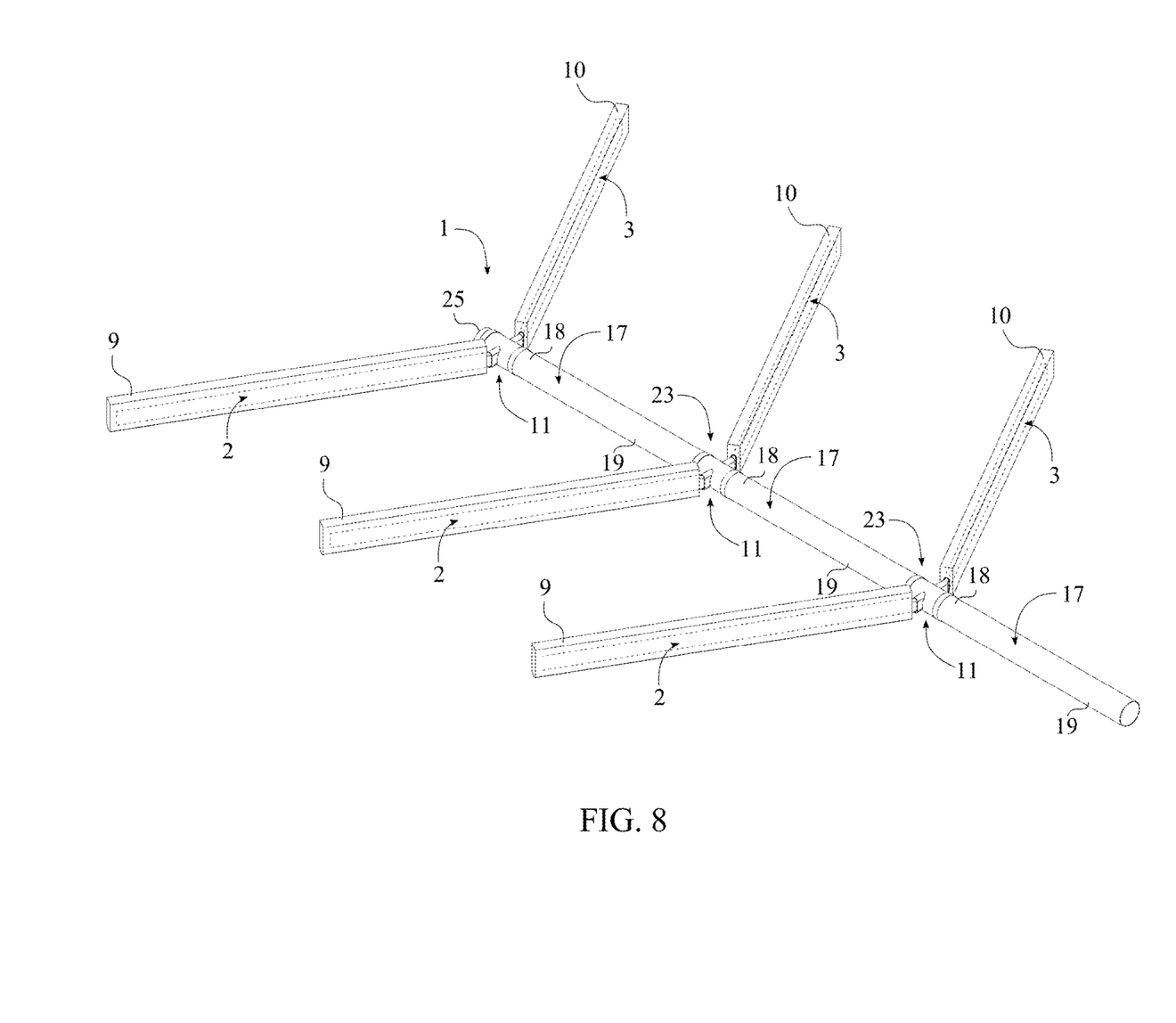
FIG. 8 is a perspective view of multiple drainage hub configuration of the present invention.

In reference to the FIG. 8, the second configuration of the present invention comprises multiple drainage hubs 1. More specifically, the first end 18 of the water transfer pipe 17 is in fluid communication with the first pipe receiver port 13 as the second end 19 of the water transfer pipe 17 is in fluid communication with the at least one adjacent drainage hub 23, where the at least one adjacent drainage hub 23 is similar to the drainage hub 1 in relation to the components and their configuration. The second pipe receiver port 14 is enclosed with the plug 25 so that the drainage hub 1 is able to discharge the drained water towards the direction of the at least one adjacent drainage hub 23. The at least one adjacent drainage hub 23 is in fluid communication with an additional water transfer pipe 17 that is in fluid communication with the outfall 24.

Additionally, the second end 19 of the water transfer pipe 17 can be in fluid communication with a water tank prior to the outfall 24. More specifically, the water tank is in fluid communication with the second end 19 of the water transfer pipe 17 through a control valve so that the drained water flow can be directed towards the water tank or the outfall 24. When the drained water is discharged from the drainage hub 1, the drained water is collected within the water tank so that the collect water can be reused within an irrigation system. Then the collected water is able to circulate back into the present invention as harmful pollutants, such as septic effluents, fertilizers, and chemicals, are cleaned through the existing landscape. More specifically, the existing landscape provides bio-filtration for the collected water so that the drained water does not contaminate the outfall 24 and damage the marine life within the outfall 24.

Since the drainage hub 1 and the water transfer pipe 17 of the present invention are linearly configured through the system and completely eliminates hydrodynamic resistance components such as waffle boards, drain boards, and corners, the present invention is able to efficiently decrease the hydrodynamic resistance which leads into less buildup within the system. As a result, the present invention requires less maintenance overtime. Due to the decrease amount of hydrodynamic resistance of the present invention, the present invention can be manufactured into a compact system. When the first compact drainage fixture 2, the second compact drainage fixture 3, and the water transfer pipe 17 are secured to the universal adaptor 11, the present invention can utilize different securing methods such as glue, plastic straps, friction fit, snap fit, and any other type of similar securing methods. Additionally, couplings can also be used to adapt different type and size within the present invention.

The particle filter system 20 is positioned atop the drainage hub 1 and the water transfer pipe 17 as the particle filter system 20 is in fluid communication with the first drain mix channel 9 and the second drain mix channel 10. The particle filter system 20 functions as a first part of the primary filtration process before the surface water and ground water reaches the first compact drainage fixture 2 and the second compact drainage fixture 3. In other words, the particle filter system 20 is able to filter out most of the fine sediments before they reach the first drain mix channel 9 and the second drain mix channel 10. The particle filter system 20 comprises a dressing mix layer 21 and a finishing mix layer 22. However, depending on the site requirements, the particle filter system 20 can utilize either combination of the dressing mix layer 21 and the finishing mix layer 22 or the dressing mix layer 21.

In reference to the FIG. 9, when a smooth and even surface is required, the present invention utilizes both the dressing mix layer 21 and the finishing mix layer 22. The dressing mix layer 21 is composed of clean particles that are smaller than the particle size of the first drain mix channel 9 and the second drain mix channel 10. The dressing mix layer 21 of the present invention is preferably composed with sand, compost, bio char, and fish bone meal in order to maintain sufficient void spaces for the surface water and ground water penetration and infiltration. The dressing mix layer 21 is positioned atop the first drain mix channel 9 and the second drain mix channel 10 as the dressing mix layer 21 is in fluid communication with the first drain mix channel 9 and the second drain mix channel 10. The finishing mix layer 22 composed of clean particles that are smaller than the particle size of the dressing mix layer 21 as the finishing mix layer 22 is positioned atop the dressing mix layer 21 opposite of the first drain mix channel 9 and the second drain mix channel 10. The finishing mix layer 22 is in fluid communication with the dressing mix layer 21 so that surface water and ground water is able to seep through the finishing mix layer 22 and the dressing mix layer 21 and into the first drain mix channel 9 and the second drain mix channel 10.

In reference to the FIG. 10, when a smooth surface is required, the present invention utilizes only the dressing mix layer 21. The dressing mix layer 21 is positioned atop the first drain mix channel 9 and the second drain mix channel 10 as the dressing mix layer 21 is in fluid communication with the first drain mix channel 9 and the second drain mix channel 10. As a result, surface water and ground water is able to seep through the dressing mix layer 21 and into the first drain mix channel 9 and the second drain mix channel 10.

Before the installation of the present invention, it is important to aerate the drainage area using a core-type aerator. Then the appropriate outfall 24 is selected so that a trench can be created within the drainage area with a positive drainage. The trench is preferably created with 1% to 2% slope as the outfall 24 is positioned lower than the drainage area. The trench comprises a central trench that extends through the center of the drainage area and a plurality of lateral trenches that angularly extends away from the central trench so that the present invention can be placed within the drainage area. Then the drainage hub 1 and the water transfer pipe 17 are placed within the central trench and the lateral trenches along with the placement of the first drain mix channel 9 and the second drain mix channel 10. Once the drainage hub 1 and the water transfer pipe 17 are placed according to the positive drainage, the water transfer pipe 17 is connected with the outfall 24 so that the drained water can be discharged into the outfall 24. Then the dressing mix layer 21 is evenly applied on top of the first drain mix channel 9, the second drain mix channel 10, and the rest of the drainage area. Grass seed is then spread across the drainage area so that the grass can be grown overtime as the grass can grow through the dressing mix layer 21. The lawn is given enough time to grow through and reestablish itself at the new grade. Additional layers of the dressing mix layer 21 can be added until the desired elevation and biological soil condition is achieved. If the finishing mix layer 22 is utilized within the present invention, the finishing mix layer 22 is evenly applied on top of the dressing mix layer 21 in order to achieve a smooth and even appearance.

The layered configuration and the graduated particle size of the finishing mix layer 22, the dressing mix layer 21, the first drain mix channel 9, and the second drain mix channel 10 allow surface water and ground water to penetrate while filtering out most of the sediments. More specifically, the particles of the finishing mix layer 22, the dressing mix layer 21, the first drain mix channel 9, and the second drain mix channel 10 are sized to create interstitial spaces in between each other. Then the finishing mix layer 22, the dressing mix layer 21, the first drain mix channel 9, and the second drain mix channel 10 create particle bridging within the present invention so that particles from top layer do not penetrates into the bottom layer as the surface and ground water is able to drain through the interstitial spaces of the finishing mix layer 22, the dressing mix layer 21, the first drain mix channel 9, and the second drain mix channel 10. This process is used in conjunction with a core type lawn aeration program to be done once prior to digging trenches and twice a year there after to achieve a maximum biological benefit. During the period of rain or irrigation, excess surface water and ground water is able to travel down the means of gravity through the finishing mix layer 22, the dressing mix layer 21, the first drain mix channel 9, the second drain mix channel 10, and into the core channels 4 through the filter socks 8 and the spacer nettings 7. Since surface water and ground water travels through multiple layers of filtrations, the larger to finer sediments of surface water and ground water are removed from surface water and ground water so that the present invention is able to efficiently discharge drained water away from the system. The removal of the excess surface water and ground water combined with the greatly improved habitat and food supplied for microorganisms in the dressing mix layer 21 strengthens the symbiotic relationship providing food and water for the lawn as it needed for sustainable growth. On the other hand, less water and fertilizer are applied to maintain a healthy lawn, wherein the present invention creates an eco-friendly process. The compact size of the present invention is also able to provide a cost effective unit compare to the existing drainage system. More specifically, the present invention is able to save a lot of money during the installation process compare to existing drainage system as installers use less amount of labor and less damage is done to the landscape. For example, installers need to remove less amount of dirt in order to create the trench while less amount of dirt is required after the present invention is placed within the trench.

Although the invention has been explained in relation to its preferred embodiment, it is to be understood that many other possible modifications and variations can be made without departing from the spirit and scope of the invention as hereinafter claimed.

What is claimed is:

1. A compact profile water catchment and soil treatment system comprises:
   a drainage hub;
   a water transfer pipe;
   a particle filter system;
   the drainage hub comprises a first compact drainage fixture, a second compact drainage fixture, a first drain mix channel, a second drain mix channel, and a universal adaptor;
   the universal adaptor comprises a housing sleeve, a first pipe receiver port, a second pipe receiver port, a first compact drainage fixture receiver port, and a second compact drainage fixture receiver port;
   the first compact drainage fixture and the second compact drainage fixture being in fluid communication with the universal adaptor;
   the first drain mix channel being in fluid communication with the first compact drainage fixture;
   the second drain mix channel being in fluid communication with the second compact drainage fixture;
   a first end of the water transfer pipe being in fluid communication with the first pipe receiver port;
   the particle filter system being position atop the drainage hub and the water transfer pipe;
   the particle filter system being in fluid communication with the first drain mix channel and the second drain mix channel;
   the first compact drainage fixture and the second compact drainage fixture each comprise a core channel, a spacer netting, and a filter sock;
   the core channel being in fluid communication with the spacer netting;
   the core channel being perimetrically encircled by the spacer netting;
   the spacer netting being in fluid communication with the filter sock;
   the spacer netting being perimetrically encircled by the filter sock;
   the core channel comprises a plurality of drain notches and a plurality of lateral support struts;
   the plurality of drain notches being externally positioned across the core channel adjacent to the spacer netting; and
   the plurality of lateral support struts being internally connected along the core channel.

2. The compact profile water catchment and soil treatment system as claimed in claim 1 comprises:
   the first pipe receiver port and the second pipe receiver port being oppositely positioned of each other across the housing sleeve;
   the first compact drainage fixture receiver port and the second compact drainage fixture receiver port traversing into the housing sleeve; and
   the first compact drainage fixture receiver port and the second compact drainage fixture receiver port being oppositely positioned from each other in between the first pipe receiver port and the second pipe receiver port.

3. The compact profile water catchment and soil treatment system as claimed in claim 1 comprises:
   the core channel of the first compact drainage fixture being in fluid communication with the first compact drainage fixture receiver port;
   the filter sock of the first compact drainage fixture being enclosed opposite of the universal adaptor;
   the core channel of the second compact drainage fixture being in fluid communication with the second compact drainage fixture receiver port; and
   the filter sock of the second compact drainage fixture being enclosed opposite of the universal adaptor.

4. The compact profile water catchment and soil treatment system as claimed in claim 1 comprises:
   the first drain mix channel being in fluid communication with the filter sock of the first compact drainage fixture;
   the filter sock of the first compact drainage fixture being encircled by the first drain mix channel;
   the second drain mix channel being in fluid communication with the filter sock of the second compact drainage fixture; and
   the filter sock of the second compact drainage fixture being encircled by the second drain mix channel.

5. The compact profile water catchment and soil treatment system as claimed in claim 1, wherein the second pipe receiver port is enclosed with a plug.

6. The compact profile water catchment and soil treatment system as claimed in claim 1, wherein a second end of the water transfer pipe is in fluid communication with at least one adjacent drainage hub.

7. The compact profile water catchment and soil treatment system as claimed in claim 1, wherein a second end of the water transfer pipe is in fluid communication with an outfall.

8. The compact profile water catchment and soil treatment system as claimed in claim 1 comprises:
   the particle filter system comprises a dressing mix layer and a finishing mix layer;
   the dressing mix layer being positioned atop the first drain mix channel and the second drain mix channel;
   the dressing mix layer being in fluid communication with the first drain mix channel and the second drain mix channel;
   the finishing mix layer being positioned atop the dressing mix layer opposite of the first drain mix channel and the second drain mix channel; and
   the finishing mix layer being in fluid communication with the dressing mix layer.

9. The compact profile water catchment and soil treatment system as claimed in claim 1 comprises:
   the particle filter system comprises a dressing mix layer;
   the dressing mix layer being positioned atop the first drain mix channel and the second drain mix channel; and
   the dressing mix layer being in fluid communication with the first drain mix channel and the second drain mix channel.

10. The compact profile water catchment and soil treatment system as claimed in claim 1 comprises:
    the core channel being shaped into an elongated flat oval shape.

11. A compact profile water catchment and soil treatment system comprises:
a drainage hub;
a water transfer pipe;
a particle filter system;
the drainage hub comprises a first compact drainage fixture, a second compact drainage fixture, a first drain mix channel, a second drain mix channel, and a universal adaptor;
the first compact drainage fixture and the second compact drainage fixture each comprise a core channel, a spacer netting, and a filter sock;
the universal adaptor comprises a housing sleeve, a first pipe receiver port, a second pipe receiver port, a first compact drainage fixture receiver port, and a second compact drainage fixture receiver port;
the core channel being in fluid communication with the spacer netting;
the core channel being perimetrically encircled by the spacer netting;
the spacer netting being in fluid communication with the filter sock;
the spacer netting being perimetrically encircled by the filter sock;
the first compact drainage fixture and the second compact drainage fixture being in fluid communication with the universal adaptor;
the first drain mix channel being in fluid communication with the first compact drainage fixture;
the second drain mix channel being in fluid communication with the second compact drainage fixture;
a first end of the water transfer pipe being in fluid communication with the first pipe receiver port;
the particle filter system being position atop the drainage hub and the water transfer pipe;
the particle filter system being in fluid communication with the first drain mix channel and the second drain mix channel;
the core channel comprises a plurality of drain notches and a plurality of lateral support struts;
the plurality of drain notches being externally positioned across the core channel adjacent to the spacer netting; and
the plurality of lateral support struts being internally connected along the core channel.

12. The compact profile water catchment and soil treatment system as claimed in claim 11 comprises:
the first pipe receiver port and the second pipe receiver port being oppositely positioned of each other across the housing sleeve;
the first compact drainage fixture receiver port and the second compact drainage fixture receiver port traversing into the housing sleeve; and
the first compact drainage fixture receiver port and the second compact drainage fixture receiver port being oppositely positioned from each other in between the first pipe receiver port and the second pipe receiver port.

13. The compact profile water catchment and soil treatment system as claimed in claim 11 comprises:
the core channel of the first compact drainage fixture being in fluid communication with the first compact drainage fixture receiver port;
the filter sock of the first compact drainage fixture being enclosed opposite of the universal adaptor;
the core channel of the second compact drainage fixture being in fluid communication with the second compact drainage fixture receiver port;
the filter sock of the second compact drainage fixture being enclosed opposite of the universal adaptor;
the first drain mix channel being in fluid communication with the filter sock of the first compact drainage fixture;
the filter sock of the first compact drainage fixture being encircled by the first drain mix channel;
the second drain mix channel being in fluid communication with the filter sock of the second compact drainage fixture; and
the filter sock of the second compact drainage fixture being encircled by the second drain mix channel.

14. The compact profile water catchment and soil treatment system as claimed in claim 11, wherein the second pipe receiver port is enclosed with a plug.

15. The compact profile water catchment and soil treatment system as claimed in claim 11, wherein a second end of the water transfer pipe is in fluid communication with an adjacent drainage hub.

16. The compact profile water catchment and soil treatment system as claimed in claim 11, wherein a second end of the water transfer pipe is in fluid communication with an outfall.

17. The compact profile water catchment and soil treatment system as claimed in claim 11 comprises:
the particle filter system comprises a dressing mix layer and a finishing mix layer;
the dressing mix layer being positioned atop the first drain mix channel and the second drain mix channel;
the dressing mix layer being in fluid communication with the first drain mix channel and the second drain mix channel;
the finishing mix layer being positioned atop the dressing mix layer opposite of the first drain mix channel and the second drain mix channel; and
the finishing mix layer being in fluid communication with the dressing mix layer.

18. The compact profile water catchment and soil treatment system as claimed in claim 11 comprises:
the particle filter system comprises a dressing mix layer;
the dressing mix layer being positioned atop the first drain mix channel and the second drain mix channel; and
the dressing mix layer being in fluid communication with the first drain mix channel and the second drain mix channel.

19. The compact profile water catchment and soil treatment system as claimed in claim 11 comprises:
the core channel being shaped into an elongated flat oval shape.

* * * * *